United States Patent
Trethewey et al.

(10) Patent No.: US 10,078,900 B2
(45) Date of Patent: Sep. 18, 2018

(54) PROVIDING SUPPORT FOR DISPLAY ARTICULATION-RELATED APPLICATIONS

(75) Inventors: James R. Trethewey, Hillsboro, OR (US); David M. Putzolu, Hillsboro, OR (US); Kelly Hammond, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 13/608,356

(22) Filed: Sep. 10, 2012

(65) Prior Publication Data

US 2014/0071147 A1   Mar. 13, 2014

(51) Int. Cl.
*G06T 7/00*      (2017.01)
*G09G 3/20*      (2006.01)
*G06F 1/16*      (2006.01)

(52) U.S. Cl.
CPC ............ *G06T 7/004* (2013.01); *G06F 1/1615* (2013.01); *G06F 1/1677* (2013.01); *G09G 3/20* (2013.01); *G09G 2320/0261* (2013.01); *G09G 2340/0464* (2013.01); *G09G 2340/0492* (2013.01)

(58) Field of Classification Search
CPC .................................. G06T 7/00; G06T 7/004
USPC ........................................................ 345/581
See application file for complete search history.

(56) References Cited

U.S. PATENT DOCUMENTS

| | | | |
|---|---|---|---|
| 7,213,057 B2 | 5/2007 | Trethewey et al. | |
| 7,978,176 B2 * | 7/2011 | Forstall et al. ............... | 345/158 |
| 2004/0089528 A1 * | 5/2004 | Totsu ......................... | 200/293.1 |
| 2005/0060377 A1 | 3/2005 | Lo et al. | |
| 2005/0060575 A1 | 3/2005 | Trethewey et al. | |
| 2005/0094887 A1 * | 5/2005 | Cakir et al. .................... | 382/254 |
| 2005/0131715 A1 | 8/2005 | Trethewey | |
| 2006/0064291 A1 * | 3/2006 | Pattipatti et al. ............... | 703/14 |
| 2007/0079030 A1 | 4/2007 | Okuley et al. | |
| 2007/0228164 A1 * | 10/2007 | Lu et al. ......................... | 235/441 |
| 2008/0129666 A1 * | 6/2008 | Shimotono et al. ............ | 345/87 |
| 2008/0152034 A1 | 6/2008 | Liu et al. | |
| 2008/0165152 A1 * | 7/2008 | Forstall et al. ............... | 345/173 |
| 2008/0280641 A1 * | 11/2008 | Kristensson et al. ...... | 455/556.1 |
| 2009/0109126 A1 * | 4/2009 | Stevenson et al. ................ | 345/4 |
| 2011/0161675 A1 * | 6/2011 | Diard ............................ | 713/189 |
| 2011/0199389 A1 * | 8/2011 | Lu et al. ....................... | 345/619 |

(Continued)

OTHER PUBLICATIONS

HobbyTronics, Accelerometer and Gyro Integration, http://www.hobytroics.co.uk/accelerometer-gyro, pp. 1-2.*

(Continued)

*Primary Examiner* — Tize Ma
(74) *Attorney, Agent, or Firm* — International IP Law Group P.L.L.C.

(57) ABSTRACT

A method of providing display articulation support to a main processor of a computing device is disclosed. The method may include receiving display articulation data from a sensor at a sensor controller. The method may also include formatting, via the sensor controller, the display articulation data. The method may also include providing, via a single channel interface between the sensor controller and the main processor, the display articulation data to an operating system executed by the main processor. The method may also include communicating, via a driver executed by the operating system, the display articulation data to an application executed by the operating system.

3 Claims, 4 Drawing Sheets

(56) References Cited

U.S. PATENT DOCUMENTS

| | | | |
|---|---|---|---|
| 2012/0081275 A1* | 4/2012 | Helmes et al. | 345/156 |
| 2012/0254878 A1* | 10/2012 | Nachman et al. | 718/102 |
| 2012/0310746 A1* | 12/2012 | Zhao et al. | 705/14.66 |
| 2013/0044335 A1* | 2/2013 | Kobayashi | 358/1.2 |
| 2013/0229759 A1* | 9/2013 | Whitt et al. | 361/679.08 |

OTHER PUBLICATIONS

Seifert et al, Implementing Position Algorithms Using Accelerometers, Feb. 2007, Freescale Semiconductor, Inc. Rev 0, pp. 1-13.*
STMicroelectronics, Application note AN3182 Tilt measurement using a low-g 3-axis accelerometer, Apr. 2010, STMicroelectronics, pp. 1-18.*
Wolfram Mathworld, Angle Standard Position, May 13, 2015, mathworld.wolfram.com/AngleStandardPosition.html, pp. 1.*
Needham, et al., "Orientation Sensing Computing Devices", PCT Patent Application No. PCT/US2012/030488, filed on Mar. 25, 2012, 29 pages.
Trethewey, et al., "Providing Support for Device States", U.S. Appl. No. 13/608,683, mailed on Sep. 10, 2012, 30 pages.
Trethewey, et al., "Sensor and Context Based Adjustment of the Operation of a Network Controller", U.S. Appl. No. 13/608,419, field Sep. 10, 2012, 31 pages.
Trethewey, et al., "Providing Support for Position-Related Applications", U.S. Appl. No. 13/608,159, filed Sep. 10, 2012, 30 pages.
Kumar, et al., "Cascading Power Consumption", U.S. Appl. No. 13/608,479, filed Sep. 10, 2012, 34 pages.

* cited by examiner

PROVIDING SUPPORT FOR DISPLAY ARTICULATION-RELATED APPLICATIONS

TECHNICAL FIELD

This disclosure relates generally to sensor controllers and more specifically, but not exclusively, to providing display articulation data from a sensor controller to an operating system.

BACKGROUND ART

Some devices may have a folding or clamshell design. These designs may allow a display to be oriented or articulated in a variety of positions in relation to a base. However, current operating systems do not provide support for accurately detecting articulation states of the display in relation to the base when the device is in a non-tablet or non-slate orientation.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Many applications may utilize information relating to the display articulation of the computing device on which they are operating. As used herein, the term "display articulation" is used to refer to an angular positioning and/or linear extension of a display in relation to a base of the computing device. For example, computing devices such as laptops, convertible tablets, and flip-style phones, among others, include a base with a motherboard, and a lid that is capable of tilting or extending with respect to the base. Current computer operating systems (OS) do not provide support for display articulation sensors in non-tablet or slate computing devices. This makes developing applications for non-tablet or slate computing devices difficult, especially when the display is articulated into an orientation different than coplanar to where the device's orientation sensors are located.

As discussed above, the present techniques relate generally to providing support to an operating system for display articulation related applications. In some examples, a method for providing display articulation data to display articulation related applications is disclosed. The method may include collecting display articulation data from one or more sensors configured to provide display articulation data to a sensor controller, also referred to herein as a sensor controller hub or a sensor hub. The method may also include formatting the display articulation data at the sensor controller. The formatted display articulation data may then be provided to the operating system. The operating system may include one or more drivers to communicate the display articulation data to the display articulation related applications. The display articulation data may be combined with display orientation data from other sensors, within the sensor controller or the application, to allow the application to read data as though the display is coplanar to where the sensors are located, even if the display is articulated into an orientation different than coplanar to where the sensors are located.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
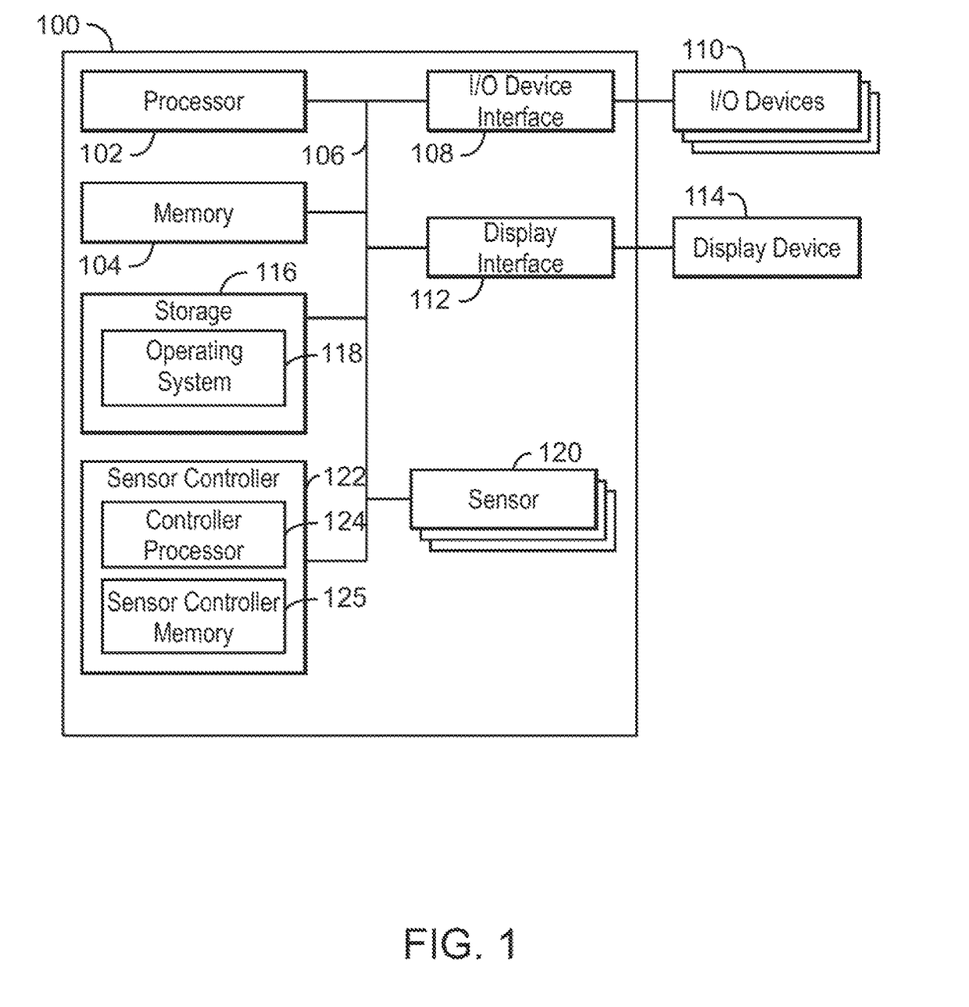
FIG. 1 is a block diagram of a computing device that provides support to an operating system for display articulation related applications, in accordance with embodiments.

FIG. 1 is a block diagram of a computing device 100 that provides support to an operating system for display articulation related applications, in accordance with embodiments. The computing device 100 may be any type of computing device that has components, such as a display and a motherboard, that are capable of being articulated in different directions, for example, a laptop computer, a convertible tablet computer, or a mobile phone, among others. The computing device 100 may include a processor 102 that is adapted to execute stored instructions, as well as a memory device 104 that stores instructions that are executable by the processor 102. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions stored in the memory device 104 and that are executed by the processor 102 may be used to implement a method that includes providing support for display articulation related applications.

The processor 102 may be connected through a system bus 106 (e.g., PCI, ISA, PCI-Express, HyperTransport®, NuBus, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system bus 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. The display device 114 may be any suitable type of display, such as a liquid crystal display (LCD), light-emitting diode (LED) display, organic light-emitting diode (OLED) display, or an Electronic Ink display.

The computing device 100 may also include a storage device 116. The storage device 116 may include a physical memory such as a hard drive, an optical drive, a flash drive, an array of drives, or any combinations thereof. The storage device 116 may also include remote storage drives. The storage device 116 may also include an operating system 118. The storage device 116 may store instructions thereon to provide display articulation data to the operating system 118. In some embodiments, the operating system 118 may execute one or more drivers. The drivers enable a piece of hardware or an application executed by the operating system 118 to communicate with the operating system 118, applications, or other hardware of the computing device 100 including sensors 120. The drivers may also be used to enable a sensor controller 122 to communicate display articulation data from the sensors 120 to the application executed by the operating system 118, in accordance with some embodiments. In some embodiments, the sensors 120 are connected to processor 102 via bus 106; however, in other embodiments, the sensors 120 are connected directly to processor 124 via a private bus (not shown), and communicatively coupled to processor 102 through processor 124 acting as intermediary. In some embodiments, the drivers reside on the memory device 104. The memory device 104 may include instructions used to provide support to an operating system for display articulation related applications in a similar manner as described in reference to the operating system 118 above.

The sensor controller 122 may include a controller processor 124. In some embodiments, the controller processor 124 is distinct from the main processor of the computing device such as the processor 102. The sensor controller 122 may also include an additional memory or storage device (also referred to herein as sensor controller memory) 125 with instructions thereon to provide display articulation data to the operating system 116.

The controller processor 124 may execute stored instructions stored on the memory device 104 and/or the storage device 116 and/or the additional memory or storage device 125 to provide display articulation data to the operating system 118. The display articulation data may include a lid state indicator, a display visibility indicator, a physical sensor indicator, an orientation lock switch indicator, a display angle of inclination indicator, a display angle of rotation indicator, a display percent of extension indicator, any combination thereof, or any other suitable data. The lid state indicator may indicate if the display device of a computing device is open or closed. A closed state may be when the display device is parallel to the base. In some embodiments, the display device may attach to the base in a closed state via a latch that indicates the closed state. An open state may be when the display device is not parallel to the base. The display visibility indicator may indicate if the display device is positioned such that the display device is visible. The physical sensor indicator may indicate if the physical sensor is connected to the base or the display. In an embodiment the sensor may be connected to the motherboard within the base. The orientation lock switch indicator may indicate if the display device is locked into a particular orientation position. The display angle of rotation indication may indicate the angle at which the display device is rotated in relation to the base. In an embodiment, the sensor may be connected to the hinge that mates the base with the display. The display percent of extension indicator may indicate the percent of extension of the display device in relation to the base.

The instructions may cause the controller processor 124 to receive display articulation data from a sensor that collects display articulation data, such as the one or more sensors 120. The instructions may cause the controller processor 124 to format the display articulation data. Formatting may comprise converting the display articulation data to a generic data structure or format compliant with a Human Interface Device (HID) specification promulgated by the Universal Serial Bus Implementer's Forum and recognized by the operating system. The HID specifications describe a method by which a device such as a sensor can report its information in a vendor-independent manner and can be interpreted by common device drivers and represented to applications in a generalized format. The instructions may cause the controller processor 124 to provide the formatted display articulation data to at least one driver of the operating system 118.

The controller processor 124 may provide the display articulation data to at least one driver of the operating system 118. The driver enables the display articulation data to be communicated with the application executed by the operating system 118. Examples of applications that can use display articulation data to alter the display include navigation applications, games, and the like. Forwarding the display articulation data to the application allows the applications to read the information and function as though the base of the computing device is coplanar with the display, whether a device is in a slate mode or a non-slate mode.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
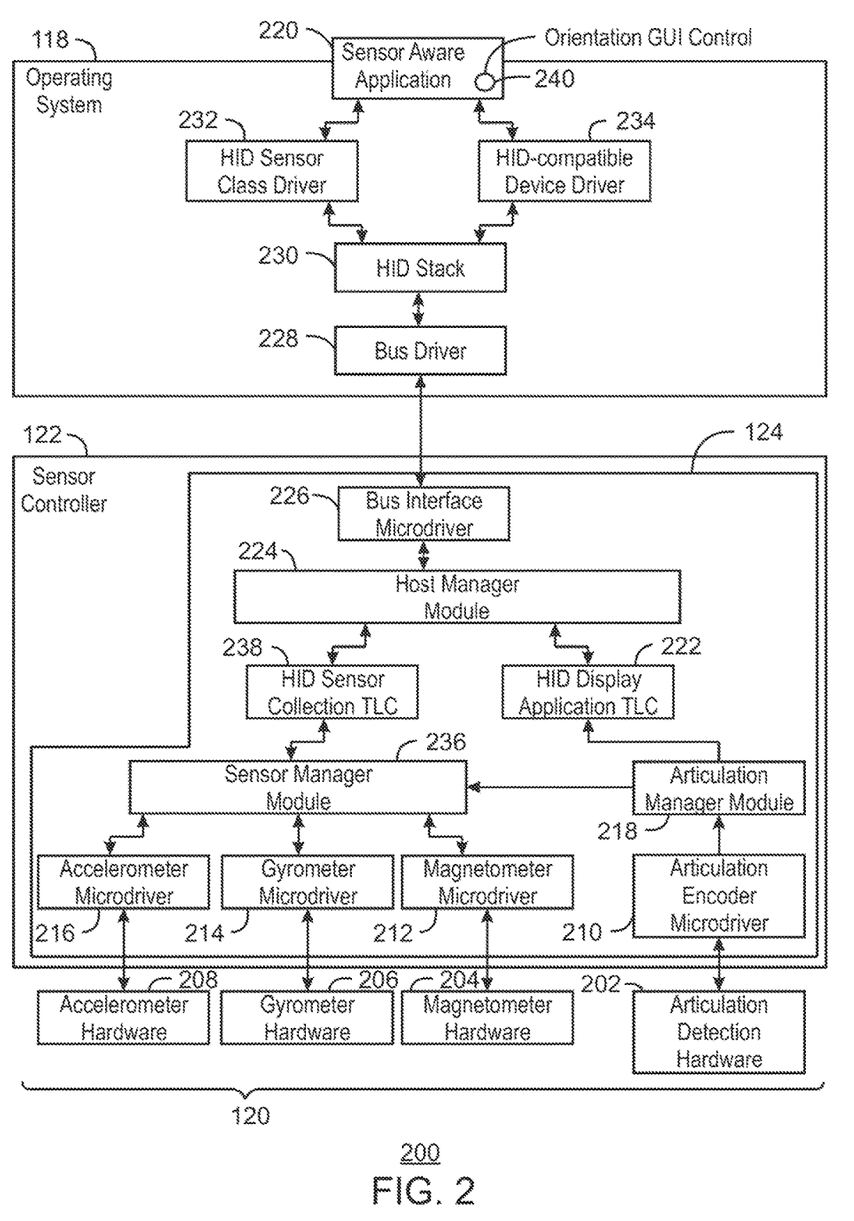
FIG. 2 is a system for providing support to an operating system for display articulation related applications, in accordance with embodiments.

In some embodiments, the functions performed as a result of instructions carried out by controller processor 124 may be coordinated by a system. FIG. 2 describes a system 200 including the sensor controller 122 and the operating system 118, which may be included in the computing device 100 of FIG. 1. In addition, the system 200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

As shown in FIG. 2, the sensor controller 122 may be communicatively coupled to the operating system 118, and may include the controller processor 124. The instructions involved in providing position support to the operating system 118 may be carried out by the controller processor 124 rather than a main processor, such as the processor 102 of the computing device 100. By including the controller processor 124, power may be saved in processing the task of providing position data to applications on the operating system 118.

FIG. 2 depicts sensor 202 which may be included in the one or more sensors 120. Sensor 202 may be articulation detection hardware. The articulation detection hardware may include a pin switch, a momentary switch, a Hall-effect switch, a reed switch, and/or an angular position encoder. The articulation detection hardware may be external hardware connected to the sensor controller and may detect the relative articulation of a device display with respect to a device motherboard, such as a motherboard located within a base. Sensors 120 may further include sensors 204, 206, and 208. Sensors 204, 206, and 208 may be internally packaged or externally connected sensor hardware devices and may include, for example, a magnetometer 204, a gyrometer 206, an accelerometer 208, and any other suitable sensor. The sensors 204, 206, and 208 may be connected to the device motherboard, such as mounted on the device motherboard. The motherboard may be articulated such that it is not coplanar with one or more attached displays 114.

In examples, system 200 may include one or more microdrivers 210, 212, 214, and 216. Each of the one or more microdrivers 210, 212, 214, and 216 may be individually coupled with an associated type of sensor to which each is connected. For example, an articulation encoder microdriver 210 may be coupled to the articulation detection hardware 202, a magnetometer microdriver 212 may be coupled to the magnetometer hardware 204, a gyrometer microdriver 214 may be coupled to the gyrometer hardware 206, and an accelerometer microdriver 216 may be coupled to the accelerometer hardware 208. Each of the one or more microdrivers 210, 212, 214, and 216 may facilitate communication between the sensors 202, 204, 206, and 208 and the sensor controller 122.

The system 200 may include an articulation manager module 218 of the controller processor 124. The articulation manager module 218 accepts display articulation data from the articulation detection hardware 202 via the articulation encoder microdriver 210. The articulation manager module 218 acts as a router. In particular, the articulation manager module 218 sends the display articulation data to one of two processing paths within sensor controller 122 based on programming from the application 220 executed by the operating system 118.

The system 200 may include an HID display articulation Top Level Collection 222, also referred to herein as an HID display articulation TLC. The HID display articulation TLC 222 may format the display articulation data received from the articulation manager module 218. In particular, the HID display articulation TLC 222 may convert the display articulation data to an abstract format consistent with an HID specification.

The system 200 may further include a host manager module 224. The host manager module 224 may forward the data from the sensor controller 122 via a single channel to the operating system 118. In particular, the host manager module 224 may forward the data via a bus interface microdriver 226 to bus drivers 228 and an HID stack 230 in the operating system 118. By providing the data to the operating system 118 via a single channel, individual communication interfaces from each of the one or more sensors 202, 204, 206, and 208 can be eliminated, enabling a relatively simple interface between one or more sensors 202, 204, 206, and 208 and the operating system 118.

Once the articulation data is received by the operating system 118, the articulation data may be interpreted by the operating system 118 via one or more drivers 234 and 232. As discussed above with reference to FIG. 1, the drivers enable the articulation data to be communicated with an application, such as application 220, executed by the operating system 118.

While some operating systems may include a generic driver such as the HID sensor class driver 232, some generic class drivers do not provide support for display articulation data. Therefore, an HID-compatible device driver 234 specific to display articulation is provided in addition to generic driver 232. Both HID sensor class driver 232 and HID-compatible device driver 234 are communicatively coupled to sensor aware application 220.

The system 200 may also include a sensor manager module 236 of the controller processor 124. The sensor manager module 236 may analyze and combine the data gathered by sensors 204, 206, and 208. The sensor manager module may further combine display articulation data received from the articulation manager module 218 with the combined data from sensors 204, 206, and 208. The data may be sent from the sensor manager module 236 to the HID sensor collection TLC 238 for formatting before being forwarded by the host manager module 224 to the operating system 118 via bus interface microdriver 226 connected to bus drivers 228.

The system 200 may include a sensor aware application 220 executed by the operating system 118. The sensor aware application may use display articulation data to function appropriately on articulated devices. Examples of applications include navigation applications and games. In an embodiment, the sensor aware application 220 may ultimately receive articulation data from the articulation detecting hardware 202 and combined data from the sensors 204, 206, and 208. The application may combine the data from the articulation detecting hardware 202 with the combined data from sensors 204, 206, and 208 during the application's operation. In another embodiment, the sensor aware application 220 may ultimately receive articulation data from articulation detecting hardware 202 that has been combined with combined data from sensors 204, 206, and 208 within the sensor controller 122. In particular, the data may be combined within the sensor manager module 236. The combined data causes the host to see data as if the sensors, mounted on the motherboard, were co-planar with the display.

The system 200 may also include an orientation GUI control 240. The orientation GUI control may be utilized by a user to provide programming instructions to the system 200. The orientation GUI control 240 may provide instructions to direct the system 200 to combine the display articulation data from the articulation detection hardware 202 with the combined data from sensors 204, 206, and 208 in the application. The instructions can instruct the articulation manager module 218 to send display articulation data to the HID display articulation TLC 222. In another embodiment, the orientation GUI control 240 may provide instructions to direct the system 200 to combine the display articulation data from the articulation detection hardware 202 with the combined data from sensors 204, 206, and 208 within the sensor controller 122. The instructions can instruct the articulation manager module 218 to send the display articulation data to the sensor manager module 236, where the display articulation data may be combined with the combined data from sensors 204, 206, and 208. The orientation GUI control 240 may be located within the sensor aware application 220. The orientation GUI control 240 may be a button, a check-box, a radio-button, a menu selection, or any other selection method. The orientation GUI control 240 may cause a message to be sent by the application 220 to the sensor controller 122 requesting that the sensor controller 122 perform the combination of the display articulation data with the combined data from sensors 204, 206, and 208 or the orientation GUI control 240 may instruct the application 220 to combine the display articulation data with the combined data from sensors 204, 206, and 208.

Figure 3:
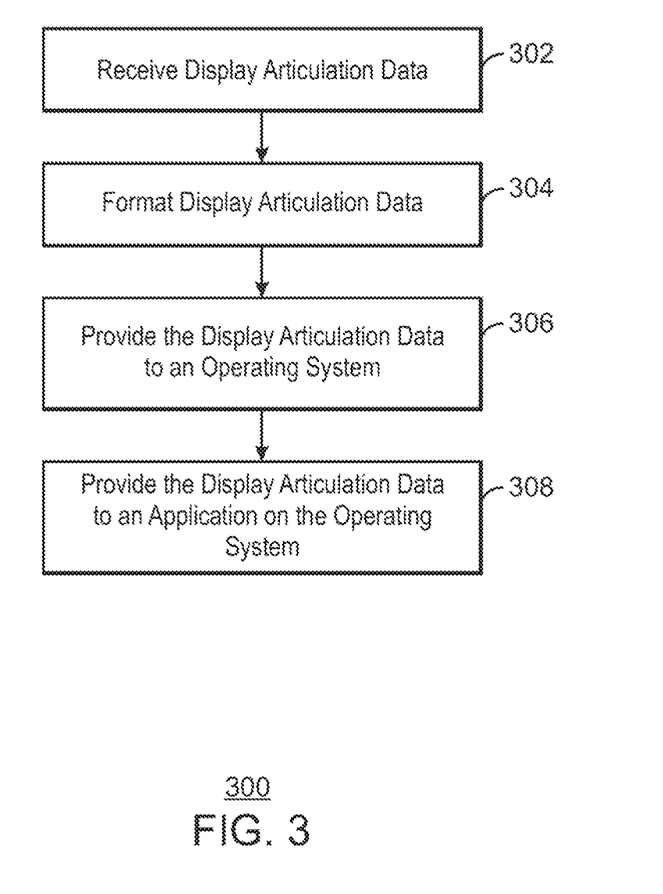
FIG. 3 is a process flow diagram showing a method for providing support to an operating system for display articulation related applications, in accordance with embodiments.

FIG. 3 is a process flow diagram showing a method 300 for providing display articulation support to a main processor of a computing device, in accordance with embodiments.

At block 302, display articulation data is received from a sensor at a sensor controller. The display articulation data may be data received from articulation detection hardware. The display articulation data may also be data received from articulation detection hardware combined with data from at least one additional sensor, such as a magnetometer, a gyrometer, and/or an accelerometer. The combined display articulation data may be combined within the sensor controller and/or within an application executed by an operating system.

The process flow continues at block 304, where the display articulation data is formatted. Formatting may include converting the display articulation data to an abstract format compliant with an HID specification.

At block 306, the formatted display articulation data is provided to the operating system. The display articulation data may be provided to the operating system via a bus connected to the sensor controller. The bus may be connected to the sensor controller via a bus interface microdriver. Thus, the display articulation data may be provided to an operating system executed by a main processor via a single channel.

At block 308, the display articulation data may be provided to an application executed by the operating system. The display articulation data may be provided to the application via drivers, such as a generic driver and an articulation-specific driver, executed by the operating system. In an embodiment, the articulation data may be data ultimately supplied by articulation detection data which may be combined in the application with combined data from sensors, such as a magnetometer, a gyrometer, and/or an accelerometer. In another embodiment, the articulation data may be articulation data from the articulation detection data combined within the sensor controller with combined data from sensors, such as a magnetometer, a gyrometer and/or an accelerometer. In a further embodiment, the articulation data may be data ultimately supplied by articulation detection data which may be combined within the operating system with combined data from sensors, such as a magnetometer, a gyrometer, and/or an accelerometer; wherein the combined data is acted upon directly by the operating system and/or is delivered by the operating system to an application executed by the operating system.

As described above, examples of a computing device may include a personal computer (PC), laptop computer, ultralaptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a computing device may also include a computer that is arranged to be worn or grasped by a person, such as a wrist computer, finger computer, ring computer, eyeglass computer, belt-clip computer, arm-band computer, shoe computer, clothing computer, pen computer, puck computer, or any other suitable type of wearable or graspable computer. For example, the computing device may be implemented as a smart phone capable of executing computer applications, as well as voice communications and/or data communications. Although some embodiments may be described with a computing device implemented as a smart phone by way of example, it may be appreciated that other embodiments may be implemented using other mobile computing devices as well. The computing device may also include a graphics processing unit (GPU) that is configured to execute stored instructions and a storage device that stores instructions.

Figure 4:
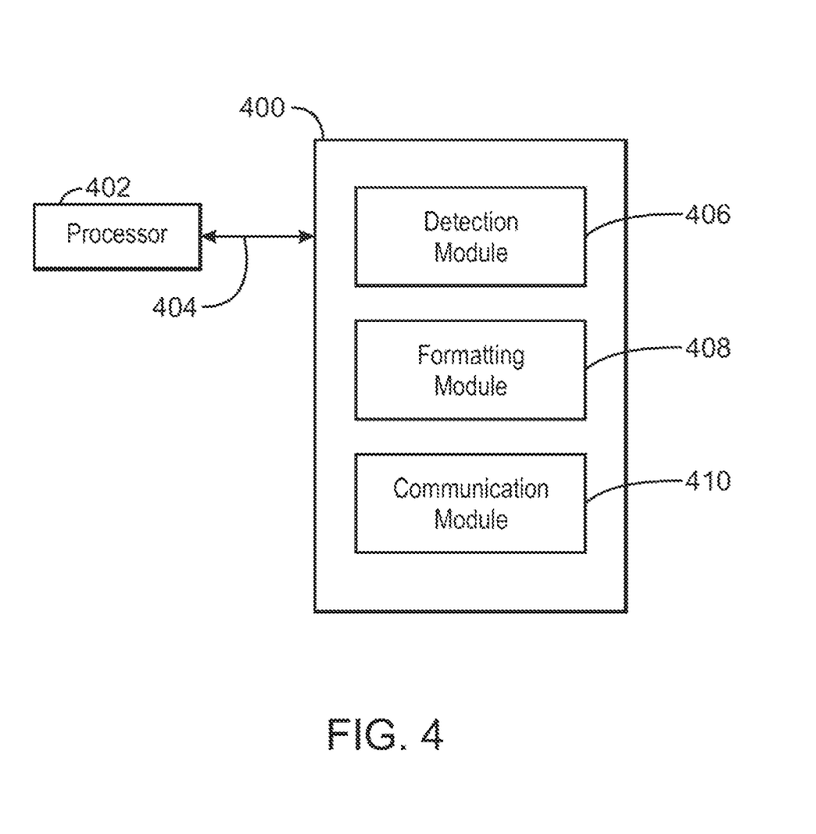
FIG. 4 is a block diagram showing a tangible, non-transitory computer readable medium that stores code for providing display articulation support to applications of a computing device in accordance with embodiments.

FIG. 4 is a block diagram showing a tangible, non-transitory computer-readable medium 400 that stores code for providing display articulation support to applications of a computing device in accordance with embodiments. The tangible, non-transitory computer-readable medium 400 may be accessed by a processor 402 over a computer bus 404. Furthermore, the tangible, non-transitory, computer-readable medium 400 may include code configured to direct the processor 402 to perform the methods described herein.

The various software components discussed herein may be stored on the tangible, non-transitory computer-readable medium 400, as indicated in FIG. 4. For example, a detection module 406 may be configured to receive display articulation data from one or more sensors communicatively coupled to the non-transitory computer-readable medium 400.

The non-transitory computer-readable medium 400 may also include a formatting module 408 configured to format display articulation data. In some embodiments, the formatting may include converting the data to an abstract format compliant with an HID specification. The non-transitory computer-readable medium 400 may further include a communication module 410. The communication module 410 may be configured to provide the formatted display articulation data to at least one driver of the operating system.

EXAMPLE 1

A system is described herein. The system includes a main processor having an operating system executing thereon. The system also includes a sensor controller communicatively coupled to at least one sensor to gather display articulation data. The sensor controller provides the display articulation data from the sensors to an application executing on the operating system. The system further includes a driver executed by the operating system to enable the sensor controller to communicate the display articulation data to the application executed by the operating system.

The system may include additional processors in the sensor controller. Also, the display articulation data may be formatted by the processor in the sensor controller before being provided to the operating system executed by the main processor. In some embodiments, the sensor may include articulation detection hardware.

EXAMPLE 2

A computing device is described herein. The computing device includes at least one sensor adapted to detect display articulation data. The computing device also includes a main processor and a computer-readable medium that stores instructions. The instructions stored in the computer-readable medium direct the processor to receive display articulation data from a sensor that collects display articulation data. The instructions also cause the processor to format the display articulation data. Additionally, the instructions cause the processor to provide the formatted display articulation data to at least driver of an operating system executed by the processor.

The computing device may also include instructions that cause the computing device to combine the display articulation data with data from additional sensors. In some embodiments, the data may be combined before being provided to the application. Alternatively, the data may be combined within the application.

EXAMPLE 3

A method is described herein. The method includes receiving display articulation data from a sensor at a sensor controller. The method also includes formatting, via the sensor controller, the display articulation data. In addition, the method includes providing the display articulation data to an operating system executed by a processor. Furthermore, the method includes communicating, via a driver executed by the operating system, the display articulation data to an application executed by the operating system.

The sensor may include articulation detection hardware. The method may also include gathering data from additional sensors, such as an accelerometer, a gyrometer, and a magnetometer. In some embodiments, the data from the articulation detection hardware may be combined with the data from the additional sensors. The data may be combined within the application. Alternatively, the data may be combined within the sensor controller before the data is provided to the operating system.

EXAMPLE 4

At least one machine readable medium having instructions stored therein is described herein. In response to being executed on a computing device, the instructions cause the computing device to receive display articulation data from a sensor communicatively coupled to the computer-readable medium. The instructions also cause the computing device to format the display articulation data. In addition, the instructions cause the computing device to provide the display articulation data to an application on an operating system via a device driver.

The instructions may also cause the computing device to combine the display articulation data with data from additional sensors. The data may be combined before being provided to the application. Alternatively, the data may be combined within the application.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a foam readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may," "might," "can," or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:
1. A method, comprising:
receiving display articulation data from articulation detection hardware and data from an internally packaged sensor;
formatting, via a sensor controller, the display articulation data combined with data from the internally packaged sensor;
providing the formatted display articulation data to an operating system executed by a processor;
communicating, via a driver executed by the operating system, the display articulation data to an application executed by the operating system; and
combining data from the articulation detection hardware with data from the internally packaged sensor; and further comprising the user providing instructions as to whether to combine the data in the sensor controller or in the application.

2. The method of claim 1, wherein the user provides the instructions using an orientation GUI control.

3. The method of claim 2, wherein the orientation GUI control is located within the application.

\* \* \* \* \*